United States Patent

Pietraski et al.

(10) Patent No.: US 12,537,851 B2
(45) Date of Patent: Jan. 27, 2026

(54) METHODS, ARCHITECTURES, APPARATUSES AND SYSTEMS DIRECTED TO ZERO-TOUCH DETERMINATION OF AUTHENTICITY OF TRANSCEIVERS IN A NETWORK

(71) Applicant: DRNC Holdings, Inc., Wilmington, DE (US)

(72) Inventors: Philip Pietraski, Jericho, NY (US); Sudhir Pattar, Mount Laurel, NJ (US)

(73) Assignee: DRNC Holdings, Inc., Wilmington, DE (US)

( * ) Notice: Subject to any disclaimer, the term of this patent is extended or adjusted under 35 U.S.C. 154(b) by 157 days.

(21) Appl. No.: 18/279,986

(22) PCT Filed: Mar. 4, 2022

(86) PCT No.: PCT/US2022/018865
§ 371 (c)(1),
(2) Date: Sep. 1, 2023

(87) PCT Pub. No.: WO2022/187593
PCT Pub. Date: Sep. 9, 2022

(65) Prior Publication Data
US 2024/0064172 A1    Feb. 22, 2024

Related U.S. Application Data

(60) Provisional application No. 63/156,815, filed on Mar. 4, 2021.

(51) Int. Cl.
*H04L 9/40*   (2022.01)
*G06F 21/73*  (2013.01)
*H04L 41/16*  (2022.01)

(52) U.S. Cl.
CPC .......... *H04L 63/1483* (2013.01); *G06F 21/73* (2013.01); *H04L 41/16* (2013.01); *H04L 63/1416* (2013.01)

(58) Field of Classification Search
CPC ................ H04L 63/1483; H04L 41/16; H04L 63/1416; G06F 21/73
See application file for complete search history.

(56) References Cited

U.S. PATENT DOCUMENTS

2020/0067616 A1 *  2/2020  Blokh ................. H04B 17/391
2022/0256341 A1 *  8/2022  Puri ...................... H04L 9/008

OTHER PUBLICATIONS

Reising et al.: "Authorized and Rogue Device Discrimination Using Dimensionally Reduced RF-DNA Fingerprints", IEEE Transactions on Information Forensics and Security, vol. 10, No. 6, Jun. 2015, 14 pages.

(Continued)

*Primary Examiner* — Shirley X Zhang
(74) *Attorney, Agent, or Firm* — Majid Albassam

(57) ABSTRACT

Procedures, methods, architectures, apparatuses, systems, devices, and computer program products directed to zero-touch determination of authenticity of transceivers in a network are provided. Among the apparatuses is an apparatus that may be configured to receive a transmission from a transmitter having an attributed identifier; obtain a predicted value output from a trained neural network based on samples of the transmission and learned information corresponding to the identifier input into the trained neural network; determine that the identifier is spoofed or not spoofed based on the predicted value and one or more criteria; and perform an action in connection with the transmission based on the determination. The apparatus may be configured to (i) issue an alert indicating that the transmission is suspicious based on a determination that the (Continued)

identifier is spoofed, or (ii) further process the transmission based on a determination that the identifier is not spoofed.

24 Claims, 14 Drawing Sheets

(56) References Cited

OTHER PUBLICATIONS

Zhou et al.: "A Robust Radio-Frequency Fingerprint Extraction Scheme for Practical Device Recognition", IEEE Internet of Things Journal, vol. 8, No. 14, Jul. 15, 2021, 14 pages.
Rajendran et al.: "Injecting Reliable Radio Frequency Fingerprints Using Metasurface for the Internet of Things", IEEE, Dec. 2020, 16 pages.
Soltani et al.: "RF Fingerprinting Unmanned Aerial Vehicles With Non-Standard Transmitter Waveforms", IEEE Transactions on Vehicular Technology, vol. 69, No. 12, Dec. 2020, 14 pages.

* cited by examiner

METHODS, ARCHITECTURES, APPARATUSES AND SYSTEMS DIRECTED TO ZERO-TOUCH DETERMINATION OF AUTHENTICITY OF TRANSCEIVERS IN A NETWORK

CROSS-REFERENCE TO RELATED APPLICATIONS

This application is a U.S. National Stage Application under 35 U.S.C. 371 of International Patent Application No. PCT/US2022/018865, filed Mar. 4, 2022, which is incorporated herein by reference in its entirety. This application claims the benefit of U.S. Provisional Patent Application No. 63/156,815 filed Mar. 4, 2021, which is incorporated herein by reference in its entirety.

BACKGROUND

Field

Embodiments disclosed herein generally relate to wireless and/or wired communications and, for example to methods, architectures, apparatuses and systems directed to zero-touch determination of authenticity of transceivers in a network.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
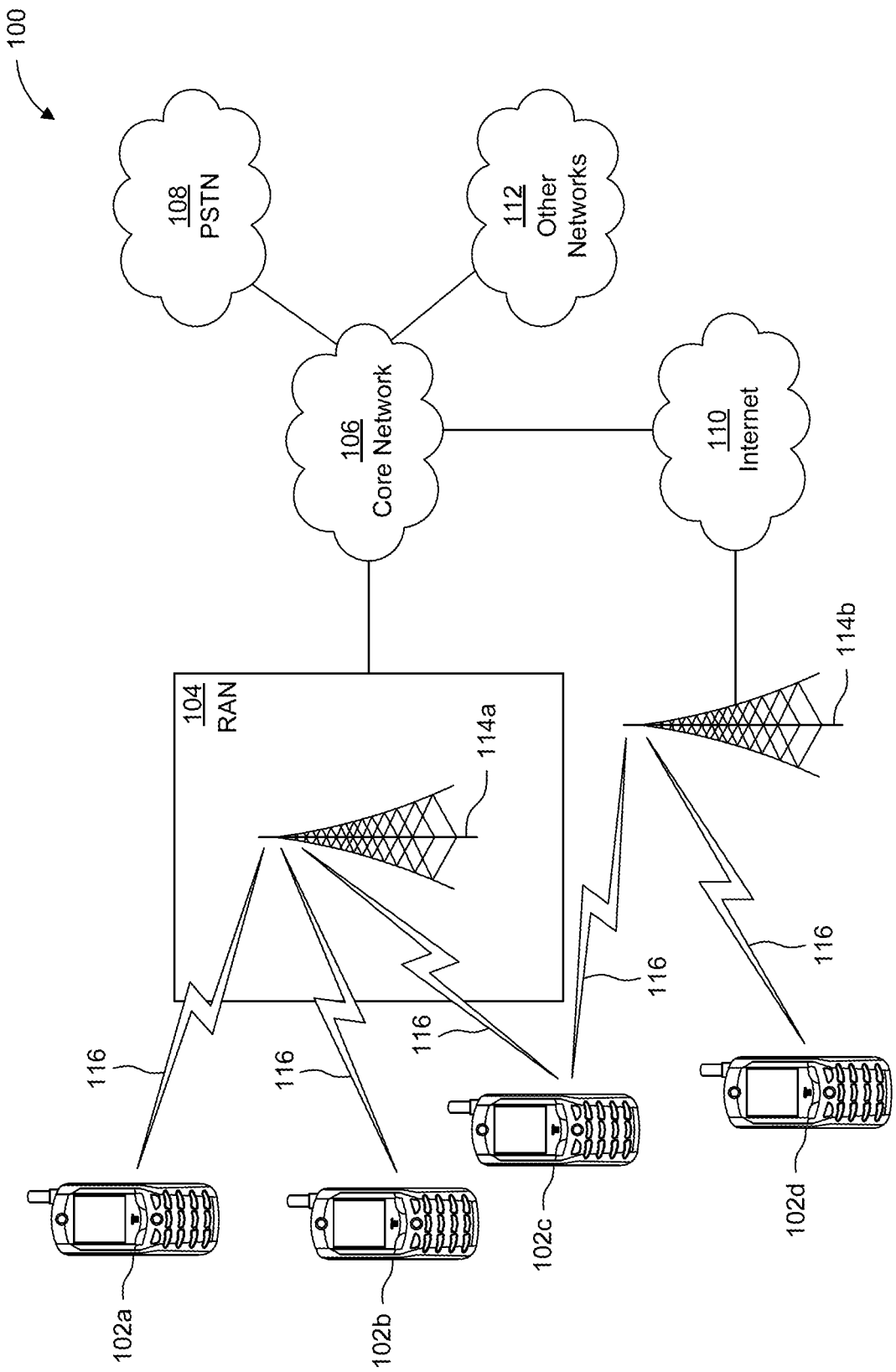
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 4A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
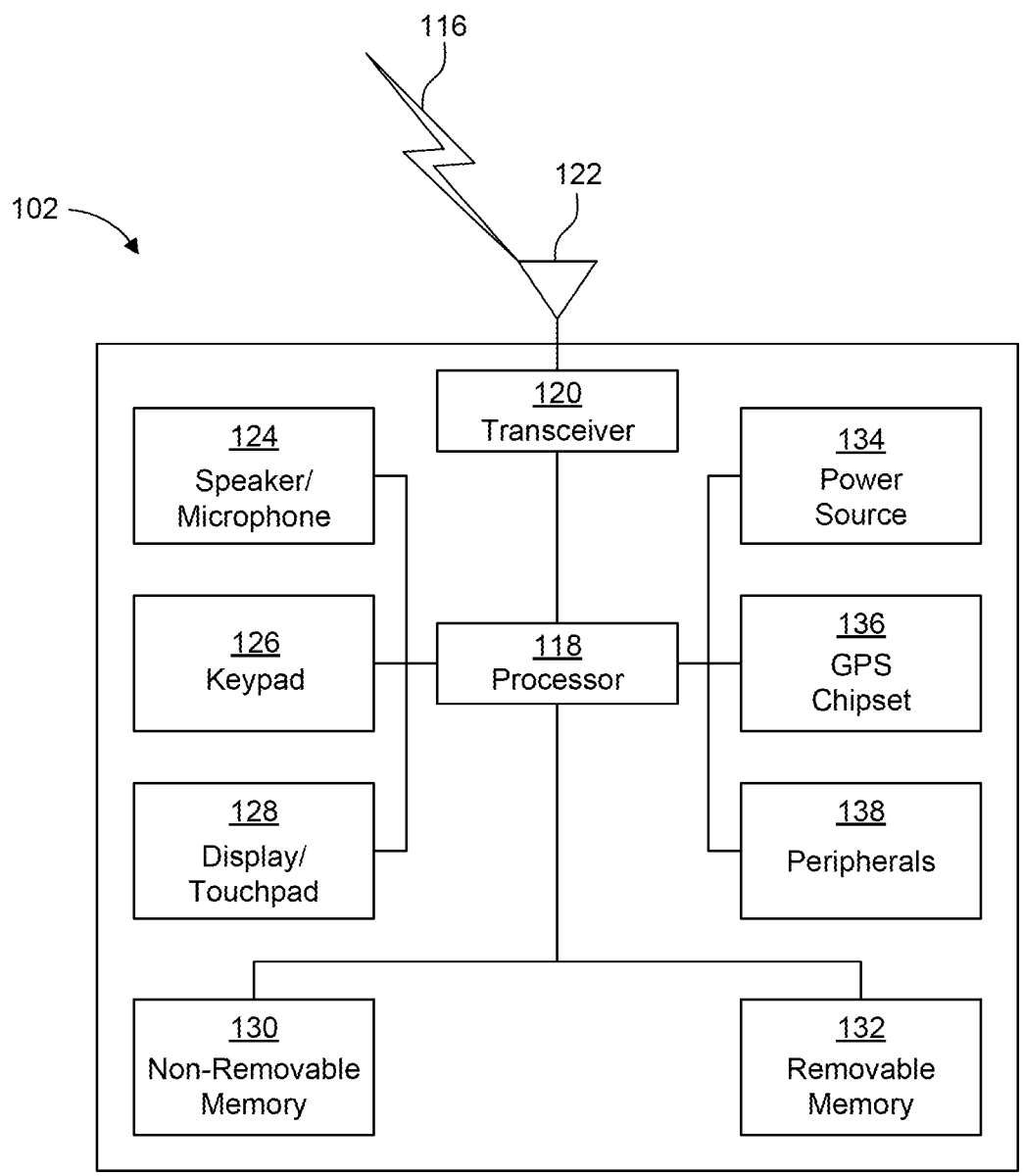
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
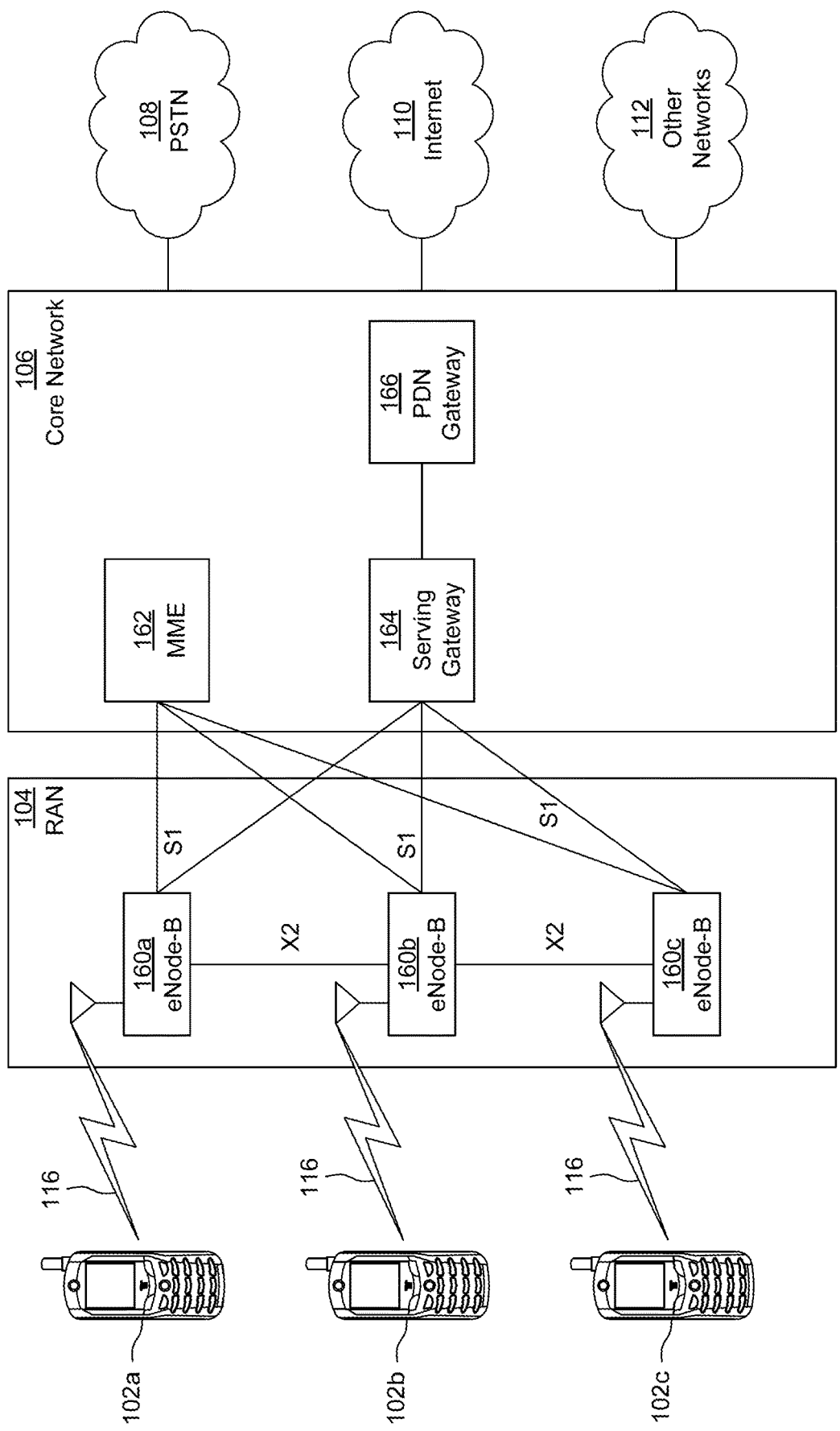
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.1 lac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11 af and 802.11 ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11 ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
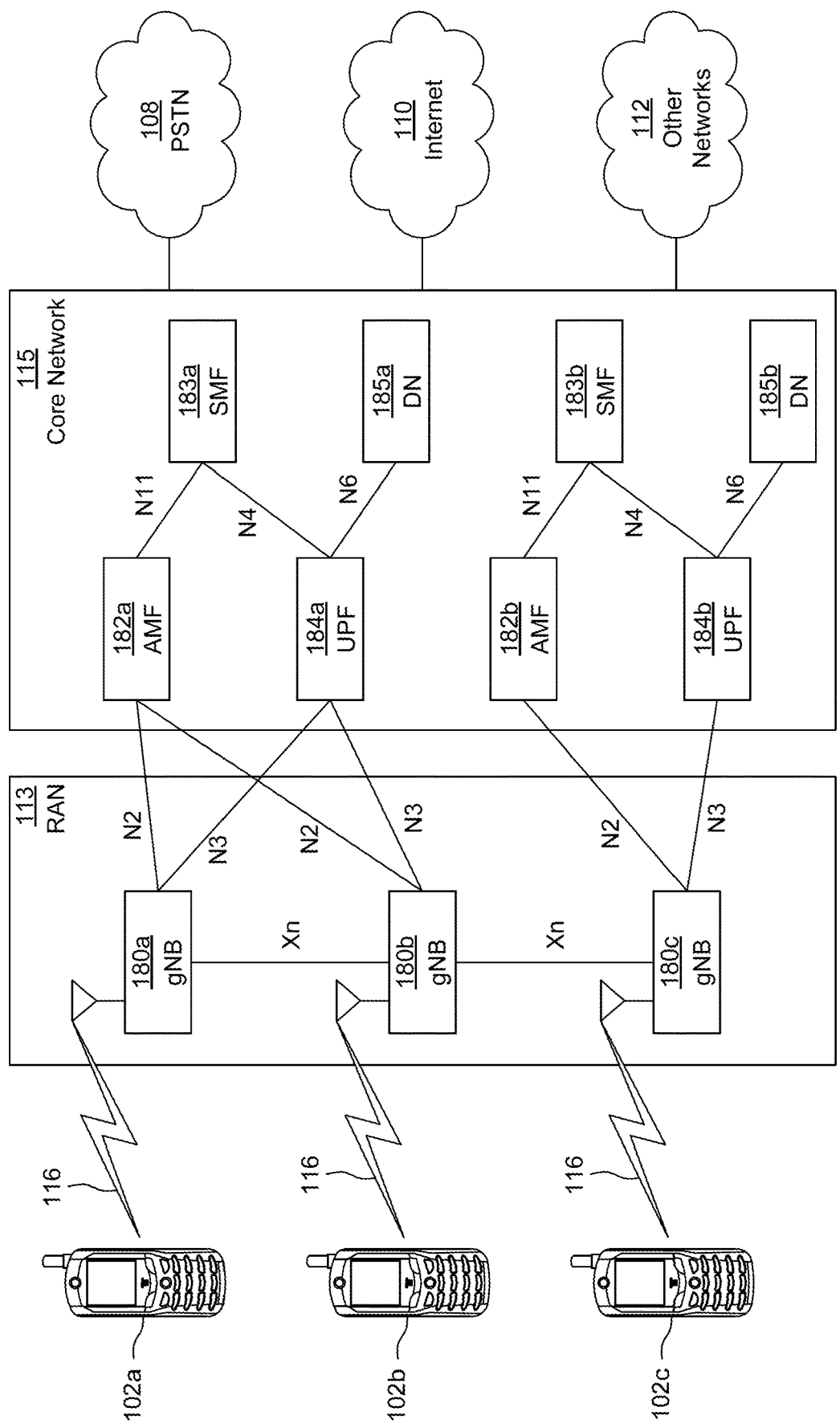
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

An internet of things, (IoT) in general, refers to a system of computing devices ("things") that are capable of exchanging data over a network, such as an internet, without little or no human interaction. The overall IoT market is expected to expand to 75 B devices and $4-11 T in economic impact by 2025 according to IHS (2016). According to Juniper research, service revenues from Low-Power IoT will grow 800% over the next five years and will exceed $2.6 billion by 2024.

The things in IoT ("IoT devices") can take many forms. An IoT device may be a sensor or actuator in a home, sensors to issue a warning if tire pressure is low, or any other thing that can be assigned a routable (e.g., IP) address. IoT devices penetrate commercial, personal, and government markets and are deployed in critical applications such as in factories, city infrastructure, worksites, utilities and health care. Low-power, low-cost, wireless IoT devices are of particular interest since they provide a means for simple and low-cost deployment of large networks thereof, and incentivize or at least removes some impediments to adoption for various applications, e.g., those that demand low-cost, low-power and/or wireless communications.

By way of example, several IoT RATs have already seen widespread adoption such as Long Range (LoRa) and Sigfox. Longer term, the 5G solution to wide coverage with support for many low data-rate devices is Narrow Band IoT (NB-IoT) and is expected to attain a larger market share. For IoT to fulfill its desired role of supporting dense sensor deployments, IoT radios must be both low power and low cost. Both of these requirements run counter to security.

One of the remaining impediments to large-scale adoption is cybersecurity. Cybersecurity remains a concern especially for low-cost, low-power IoT devices. The concern is only amplified by the sheer number of such devices that are envisioned to be connected to, e.g., a smart city network—thus creating a large attack surface. Currently, one third of IoT security breaches happen at the end points. Battery, memory and processing limitations of low-cost, low-power IoT devices make it difficult to robustly secure an IoT.

Radio frequency (RF) fingerprinting (RFFP) is one of a number of cybersecurity tools that may be used (e.g., by network operators) to prevent spoofing emitters from accessing networks. RFFP, in general, is carried out in two stages, namely extracting RF fingerprints and performing identification based on RF fingerprint. The RF fingerprints are reflections of differences between hardware components of transmitters, and the differences can be reflected in communication signals. The differences between hardware components of transmitters are, at least in part, due to differences in analog and RF components of the transmitters that result from process variation during manufacturing and assembly. This is particularly true of low-cost devices. The RF fingerprints can be extracted by processing transient signals or steady-state signals from received RF signals. The elements of an RF fingerprint of a transmitter include unique (and usually, subtle) radio transmission characteristics of that transmitter. The terms "radio" and "transmitter" may be interchangeably referred to herein. One problem with conventional RFFP techniques is that they do not scale to a large number of devices. One barrier to such scaling is that the conventional RFFP techniques rely on a single, or at best, a few, transmitter characteristics and such transmitter characteristics are those that (i) are well understood by RF engineers and (ii) can be extracted by hand engineering.

The RFFP problem is normally presented as a N-class classification problem wherein a collection of signals from N transmitters/radios are observed and a N-class classifier examines each signal and assigns it one of the N classes. More generally, each of the radio transmission signals from the N transmitters/radios is observed and analyzed, then an identity of a transmitter/radio is predicted. As an anti-spoofing tool, the N-class classifier must not use information in the signal about the transmitter's identity that could possibly be spoofed, e.g., information fields in a packet that indicate (or from which to infer) the transmitter's identity in the clear must not be used. Instead, subtle, unique imperfections in the transmitter chain are used.

Machine learning (ML) based N-class classifiers have shown encouraging performance, but better performance at scale is still needed. Furthermore, using an N-class classifier for spoofing detection has other drawbacks. The drawbacks include, for example, operation is mostly limited to analysis of radio signals that belong to a predetermined set of known radios; limited ability to trade off missed detection and false alarms; and changing the set of radios requires retraining of the classifier.

There is a need for improved RFFP that can be utilized in an IoT and/or that minimizes its impact on power consumption of the IoT devices and/or network elements.

Although motivated by IoT, RFFP also has general application to detection of spoofing transmitters of any type for which there is sufficient training data available including other mobile device types and infrastructure nodes. For example, the growing trend for small cells and private networks make it more important for the UE to validate the infrastructure node (gNB, AP, gateway, etc.).

OVERVIEW

Pursuant to the technologies and/or methodologies provided herein, the RFFP N-class classification problem is turned into a binary classification (a spoofing detector) problem with better performance. (e.g., by adding an embedding-like input to a neural network (NN) driven by an identifier (ID) of an RF emitter). Pursuant to the technologies and/or methodologies provided herein, a simple method to classify novel spoofing emitters (i.e., not in the training set) is provided, which is not available from a conventional RFFP N-class classifier. Pursuant to the technologies and/or methodologies provided herein, a controllable threshold can be used to tradeoff a probability of missing a spoofing attempt and a probability of falsely classifying. Pursuant to the technologies and/or methodologies provided herein, look-up tables for an embedding-like layer for emitter IDs may be stored in one or more databases, may be provided on request to spoofing detection NN at RF receivers and/or may be deployed without requiring retraining. Pursuant to the technologies and/or methodologies provided herein, the NN of the binary classifier can scale for added devices by making new embedding (locally or remotely) without retraining the NN.

As would be appreciated by a person of skill in the art based on the teachings herein, encompassed within the embodiments described herein, without limitation, are procedures, methods, architectures, apparatuses, systems, devices, and computer program products directed to zero-touch determination of authenticity of transceivers in a network.

Among the procedures, methods, architectures, apparatuses, systems, devices, and computer program products is a first method that may include any of: receiving a transmission including information indicating an identifier associated with a transmitter (e.g., a WTRU, a base station, etc.) that supposedly sent the transmission; inputting, into a trained neural network, one or more samples of the transmission and learned information corresponding to the identifier; obtaining a predicted value output from the trained neural network (e.g., based on the transmission samples and the learned information); determining whether the identifier is spoofed (or not spoofed) based on whether the predicted value output satisfies a threshold, and on condition that the identifier is determined to be spoofed, issuing an alert indicating that the transmission is suspicious.

Among the procedures, methods, architectures, apparatuses, systems, devices, and computer program products is a second method that may include any of: receiving a transmission from a transmitter having an attributed identifier; inputting, into a trained neural network, one or more samples of the transmission and learned information corresponding to the attributed identifier; obtaining a predicted value output from the trained neural network; determining that the identifier is spoofed or not spoofed based on the predicted value and one or more criteria; and performing one or more actions in connection with the transmission based on the determination.

Among the procedures, methods, architectures, apparatuses, systems, devices, and computer program products is a third method that may include any of: receiving a transmission from a transmitter having an attributed identifier; obtaining a predicted value output from a trained neural network, wherein the predicted value is based on (i) one or more samples of the transmission input into one or more first inputs of the trained neural network and (ii) learned information corresponding to the identifier input into one or more second inputs of the trained neural network; determining that the identifier is spoofed or not spoofed based on the predicted value and one or more criteria; and performing one or more actions in connection with the transmission based on the determination.

In various embodiments of (at least) the second and third methods, performing the one or more actions may include issuing an alert indicating that the transmission is suspicious based on (e.g., on condition that) a determination that the identifier is spoofed. In various embodiments of (at least) the second and third methods, performing the one or more actions may include further processing the transmission based on (e.g., on condition that) a determination that the identifier is not spoofed.

Among the procedures, methods, architectures, apparatuses, systems, devices, and computer program products is a fourth method that may include any of: receiving a transmission from a transmitter having an attributed identifier; inputting, into a trained neural network, one or more samples of the transmission and learned information corresponding to the attributed identifier; obtaining a predicted value output from the trained neural network; converting the predicted value into one of two values based on one or more criteria; and performing one or more actions in connection with the transmission based on the one of two values.

Among the procedures, methods, architectures, apparatuses, systems, devices, and computer program products is a fifth method that may include any of: receiving a transmission from a transmitter having an attributed identifier; obtaining a predicted value output from a trained neural network, wherein the predicted value is based on (i) one or more samples of the transmission input into one or more first inputs of the trained neural network and (ii) learned information corresponding to the identifier input into one or more second inputs of the trained neural network; converting the predicted value into one of two values based on one or more criteria; and performing one or more actions in connection with the transmission based on the one of two values.

Among the procedures, methods, architectures, apparatuses, systems, devices, and computer program products is a sixth method that may include any of: receiving a transmission from a transmitter having an attributed identifier; inputting, into a trained neural network, one or more samples of the transmission and learned information corresponding to the attributed identifier; obtaining a predicted value output from the trained neural network; determining one of two values based on the predicted value and one or more criteria; and performing one or more actions in connection with the transmission based on the one of two values.

Among the procedures, methods, architectures, apparatuses, systems, devices, and computer program products is a seventh method that may include any of: receiving a transmission from a transmitter having an attributed identifier; obtaining a predicted value output from a trained neural network, wherein the predicted value is based on (i) one or more samples of the transmission input into one or more first inputs of the trained neural network and (ii) learned information corresponding to the identifier input into one or more second inputs of the trained neural network; determining one of two values based on the predicted value and one or more criteria; and performing one or more actions in connection with the transmission based on the one of two values.

In various embodiments of (at least) the fourth through the seventh methods, performing the one or more actions may include issuing an alert indicating that the transmission is suspicious based on (e.g., conditioned on) the one of two values corresponding to the identifier being spoofed. In various embodiments of (at least) the fourth through the seventh methods, performing the one or more actions may include further processing the transmission based on (e.g., conditioned on) the one of two values corresponding to the identifier being not spoofed.

In various embodiments of any of the first through the seventh methods, the attributed identifier may be, for example, any of (i) an identifier attributed to the transmitter based on scheduler knowledge, and (ii) an identifier attributed to the transmitter based on inspection (and/or extraction) of information carried in, and/or indicated by, the transmission.

In various embodiments of any of the first through the seventh methods, the learned information may be and/or may have been derived (generated) based at least in part on categorical information associated with the attributed identifier. In various embodiments of any of the first through the seventh methods, the learned information may be learned during training of the trained NN based on a plurality of observations. The plurality of observations may include one or more samples of RF signals combined with any of (i) the categorical information, (ii) one or more interim iterations (versions) of the learned information, (iii) other learned information derived from (e.g., learned and/or trained based at least in part on) categorical information associated with a different identifier, and (iv) one or more interim iterations (versions) of the other learned information. The samples of the RF signals may include samples of RF signals collected from any of the transmitter and one or more other transmitters.

In various embodiments of any of the first through the seventh methods, the learned information may be learned without retraining of the trained NN. The learned information may be learned based on one or more values predicted by the trained NN based one or more samples of RF signals combined with any of (i) the categorical information and (ii) other learned information derived from (e.g., learned and/or trained based at least in part on) categorical information associated with a different identifier. In various embodiments, the samples of the RF signals may include samples of RF signals collected from any of the transmitter and one or more other transmitters.

In various embodiments of any of the first through the seventh methods, the learned information comprises a learned vector of values. In various embodiments of any of the first through the seventh methods, the learned vector may map to the indicated identifier or the attributed identifier. In various embodiments of any of the first through the seventh methods, the categorical information may map to the attributed identifier. In various embodiments of any of the first through the seventh method, the categorical information may be an embedding.

In various embodiments of any of the first through the seventh methods, the learned information may be learned in connection with (e.g., contemporaneously with) receipt of the transmission from a transmitter. Alternatively, or additionally, the learned information may be obtained from a local or a remote repository, e.g., based on (e.g., using) the attributed identifier and/or a proxy thereof.

In various embodiments of any of the first through the seventh methods, the predicted value may be filtered, e.g., as disclosed herein. In various embodiments of any of the second through the seventh methods, the criteria may include any of a probability of missing a spoofing attempt, a probability of falsely classifying and a tradeoff therebetween. In various embodiments of any of the second through the seventh methods, the criteria may include a threshold and/or the threshold may be based on a probability of missing a spoofing attempt, a probability of falsely classifying and a tradeoff therebetween. In various embodiments of any of the first through the seventh methods, the method may include adjusting the threshold based on a probability of missing a spoofing attempt, a probability of falsely classifying and a tradeoff therebetween.

In various embodiments of any of the first through the seventh methods, the method may include training a neural network to form the trained neural network. The neural network may be trained based at least in part on the categorical information. In various embodiments, the neural network may be trained based on a plurality of observations. The plurality of observations may include samples of RF signals combined with any of (i) the categorical information, (ii) one or more interim iterations of the learned information, (iii) other learned information derived categorical information associated with a different identifier, and (iv) one or more interim iterations of the other learned information.

In various embodiments of any of the first through the seventh methods, the method may include obtaining the categorical information and/or the plurality of observations from a repository (e.g., if the attributed identifier does not match an identifier currently in use). In various embodiments of any of the first through the seventh methods, the method may include any of determining whether the attributed identifier matches (or does not match) an identifier currently in use; and on condition that the attributed identifier does not match an identifier currently in use, obtaining the categorical information and/or the plurality of observations from a repository. In various embodiments of any of the first through the seventh methods, the method may include any of transmitting, to a repository, information indicating a request for the categorical information and/or the plurality of observations; and receiving information indicating the categorical information and/or the plurality of observations.

Figure 2:
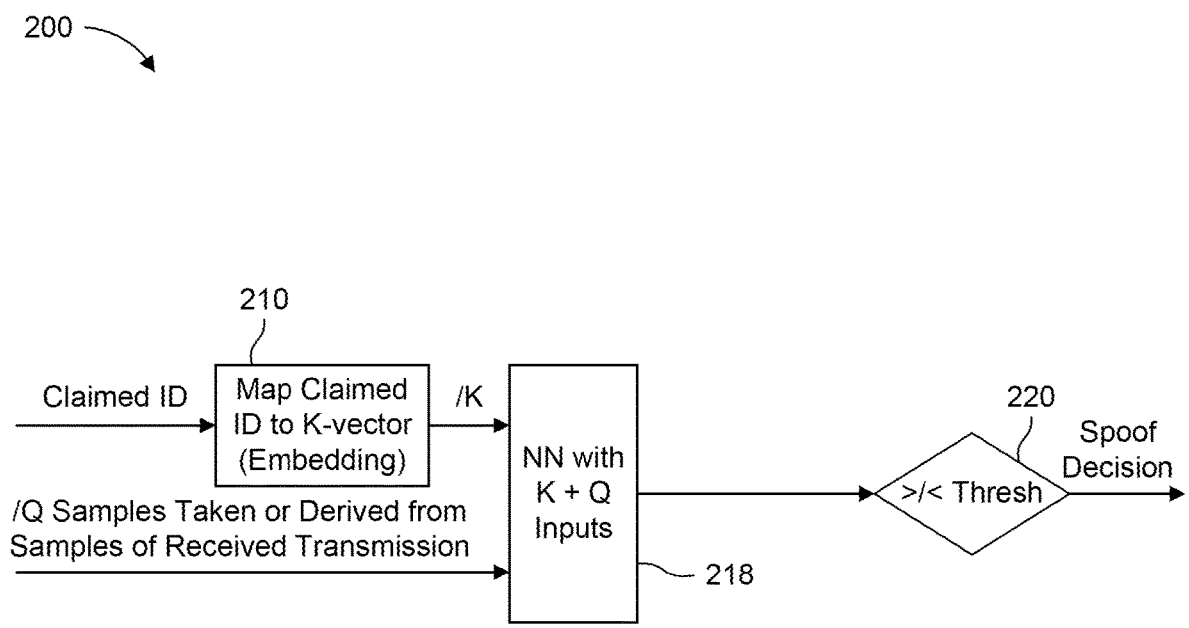
FIG. 2 illustrates an example spoofing detector.

FIG. 2 illustrates an example binary classifier 200. The binary classifier 200 may be implemented in any of an IoT device, a WTRU, a base station, etc. However, for convenience and simplicity of exposition, the binary classifier 200 is described herein as implemented in a WTRU.

The binary classifier 200 may be suitable for performing spoofing detection. The binary classifier 200, for example, may make a binary decision—one of spoofed or not-spoofed in connection with a signal received by the WTRU.

The binary classifier 200 may include an embedding element 210, a neural network (NN) 218 and a comparator 220. The NN 218 may have, or be based on, any of a multiple fully connected layer neural network architecture, a convolutional neural network (CNN) architecture, a residual neural network (ResNet) architecture and the like. The NN 218 may have k inputs in addition to continuous inputs that used for classification. The k inputs may correspond to an identifier associated with a transmitter/radio purported to be the transmitter of a received signal (and/or a device including such transmitter/radio).

The identifier may be, for example, any of (i) an identifier attributed to the transmitter/radio based on scheduler knowledge (sometimes referred to herein as an "expected identifier"), and (ii) identifier attributed to the transmitter/radio based on inspection (and/or extraction) of information carried in the signal (sometimes referred to herein as a "claimed identifier"). For convenience and simplicity of exposition, the terms "expected identifier", "claimed identifier" and "attributed identifier" may be used interchangeably herein.

The attributed identifier may be input to the embedding element 210. The embedding element 210 may obtain a learned vector of (e.g., K) values (e.g., floating point numbers) that map to the attributed identifier ("learned-ID vector"). For example, the embedding element 210 may use the attributed identifier to locate in, and/or fetch, the learned-ID vector from a data store (or repository). The data store (not shown) may be local to the WTRU or may be remotely located on another device. In case of the latter, the embedding element 210 may (e.g., trigger the WTRU to) transmit to the other device information indicating a request for the learned vector and/or the attributed identifier, and may receive the learned-ID vector in response (e.g., the receiver of the WTRU may receive information indicating the learned-ID vector and provide the learned-ID vector to the embedding element 210). The learned-ID vector may be produced using a process whose mechanics are similar to or the same as embeddings ("embedding-like process"). For example, the embedding element 210 may use the attributed identifier and the embedding-like process to learn the learned-ID vector, e.g., during training of the neural network or a portion thereof (including a case where only the embedding element/structure 210 is undergoing training).

Each of the categorical inputs may map to a distinct learned-ID vector (e.g., a learned vector of (e.g., K) values (e.g., floating point numbers) that may be input to the NN 218 as additional inputs. The learned-ID vector and one or more samples of the received signal may form the input to the NN 218. The NN 218 may use the learned-ID vector to (re)configure the behavior of the NN 218 to be optimized for spoofing detection of a particular radio. The NN 218 may generate a statistic (predictive value) based on the samples and the learned-ID vector. The NN 218 may output the statistic. In various embodiments, the statistic may be a scalar.

The statistic may be input to the comparator 220. The comparator 220 may compare the statistic to a threshold. The comparator 220 may output a first value (e.g., a "1") if the statistic satisfies (e.g., is greater than or equal to) the threshold, and may output a second value (e.g., a "0") if the statistic fails to satisfy (e.g., is less than) the threshold. The first and second values may indicate spoofed and not spoofed, respectively (or vice-versa). The threshold may be adjusted (e.g., dynamically adjusted). Adjustments to the threshold may be made during training and/or after being deployed. Adjustments to the threshold may be made on a per identifier or other granular basis (e.g., different thresholds for different learned vectors).

The threshold, in effect, may operate as an arbiter of whether the attributed identifier is spoofed (or not spoofed). The threshold may be (e.g., be set to a value) based on a probability of falsely classifying a transmitter/radio as spoofing, a probability of falsely classifying a transmitter/radio as non-spoofing (also referred to herein as a probability of missing a spoofing attempt), a combination of thereof, etc. For example, the threshold may be set (e.g., initially set or later adjusted/updated) to a value that minimizes a difference between the probability of falsely classifying a transmitter/radio as spoofing and the probability of missing a spoofing attempt. As another example, the threshold may be set (e.g., initially set or later adjusted/updated) to a value based on respective values for the probability of falsely classifying a transmitter/radio as spoofing and the probability of missing a spoofing attempt. The values for the probability of falsely classifying a transmitter/radio as spoofing and the probability of missing a spoofing attempt may be selected/determined values based on various factors.

The learned-ID vector be generated using an embedding-like process in which each of the possible categorical inputs is given a 'meaning' that the NN 218 'understands'. As indicated above, learned-ID vectors produced by the embedding-like process may serve as a means to (re)configure the behavior of the NN 218 for spoofing detection of a particular radio (which is atypical of the way in which conventional embeddings are used). Pursuant to the various embodiments disclosed herein, some or all of the following may be achieved:

1) anti-spoofing performance of the binary classifier is improved over N-class classification;
2) a spoofing radio does not need to be in the dataset of known radios;
3) a controllable (e.g., adjustable) threshold may be used to tradeoff probabilities of missing a spoofing attempt and falsely classifying a radio as spoofing; and
4) the NN may protect different groups (e.g., sets) of radios without retraining by being provided with, and utilizing, different groups (e.g., a set) of learned-ID vectors and/or categorical information. An embedding-like look-up table may be maintained in a repository (e.g., database) and distributed as needed.

Figure 3:
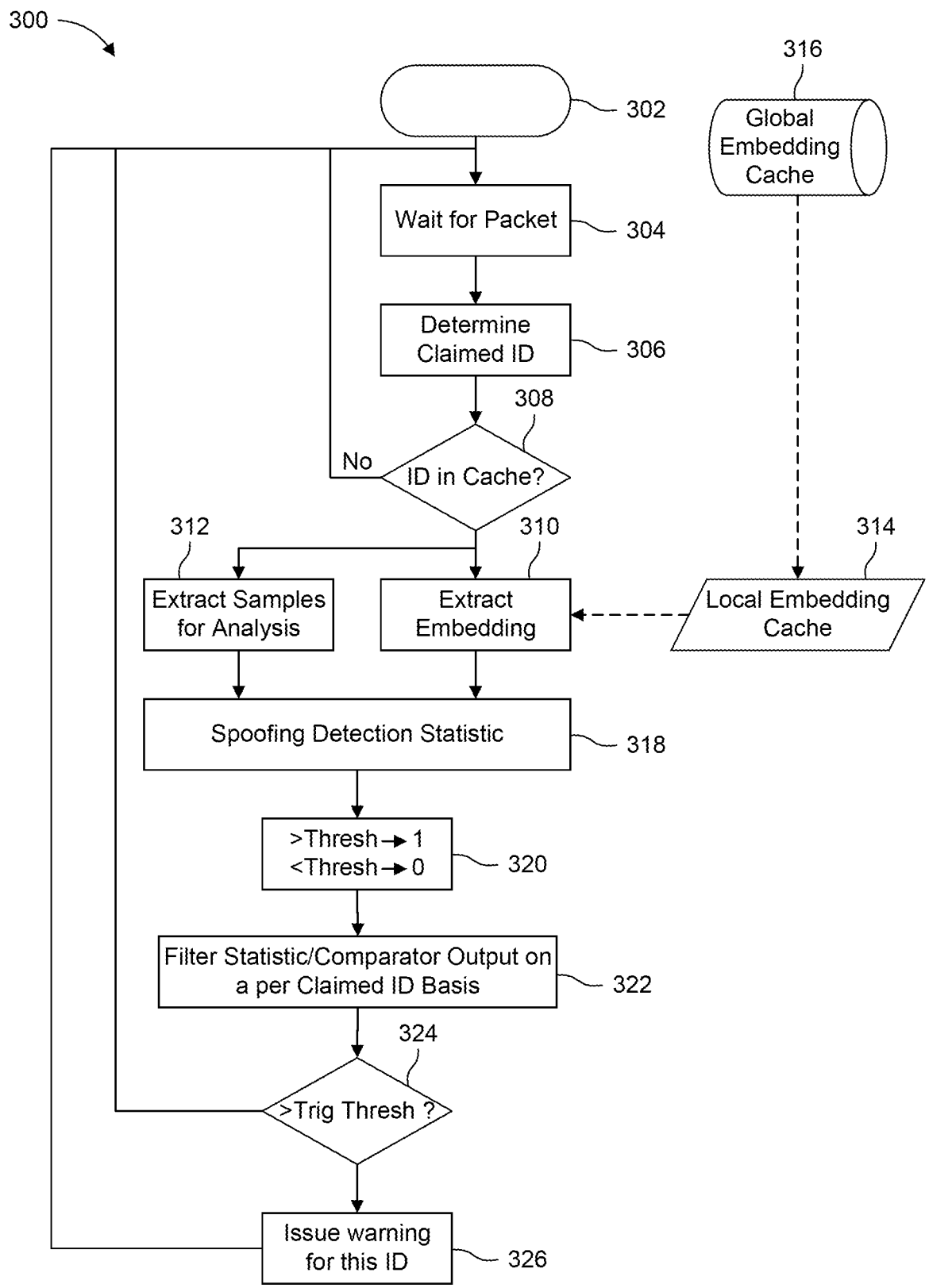
FIG. 3 is a flow chart illustrating an example flow for performing radio frequency (RF) fingerprinting (RFFP) based spoofing detection.

FIG. 3 is a flow chart illustrating an example flow 300 for performing RFFP based spoofing detection. For convenience and simplicity of exposition, the flow 300 is described in connection with a system in which a binary classifier, such as the binary classifier 200 (FIG. 2), is deployed. The flow 300 may be carried out by other architectures as well.

The system may wait for a packet to arrive (304). In a scheduled communications system, arrival time and radio resources of most packets may be known in advance, as is an expected radio identifier. In contention-based systems, e.g., LoRa, special start-of-packet (SoP) algorithms may be used to detect arrival of a packet. Following receipt of a packet, the system may obtain (e.g., extract) the corresponding claimed identifier from (e.g., the header of) the packet.

The attributed identifier may be compared to a local cache of identifiers to determine whether the corresponding transmitter/radio is in the set that is protected by the anti-spoofing system (306) and/or whether the learned-ID vector (embedding) corresponding to the attributed identifier needs to be fetched from a remote database (or alternatively, whether they are available in a local cache) (308).

If the radio with the attributed identifier is to be protected (306), samples of the received signal corresponding to the packet therein may be extracted from the received signal (312) and the learned-ID vector (embedding) may be extracted or otherwise obtained from memory (310). The samples and the learned-ID vector may be (e.g., form the) input to the NN 218. A statistic (predictive value) may be generated and output from the NN 218 (318). The statistic may be compared to a threshold (320). If the statistic satisfies (e.g., is greater than or equal to) the threshold, a first value (e.g., a "1") may be output by the comparator 220. If the statistic fails to satisfy (e.g., is less than) the threshold, then a second value (e.g., a "0") may be output by the comparator 220. The first and second value may indicate spoofed and not spoofed, respectively (or vice-versa).

The statistic or the output of a threshold comparator (320) may be filtered with a common filter or filtered on a per-claimed ID basis (322). The statistic may be filtered before or after comparison to the threshold, or not filtered at all. The filtered or un-filtered statistic output may be used to determine whether the transmission(s) associated with attributed identifier is (are) suspicious (324), e.g., whether the filtered or un-filtered statistic output satisfies a threshold. If the transmission(s) associated with attributed identifier is (are) determined to be suspicious, then a warning may be issued (326) and/or such transmission(s) may be isolated from the system, e.g., the transmitted data may not be further processed or responded to.

Example NN Architecture and Training Methodology

Figure 4:
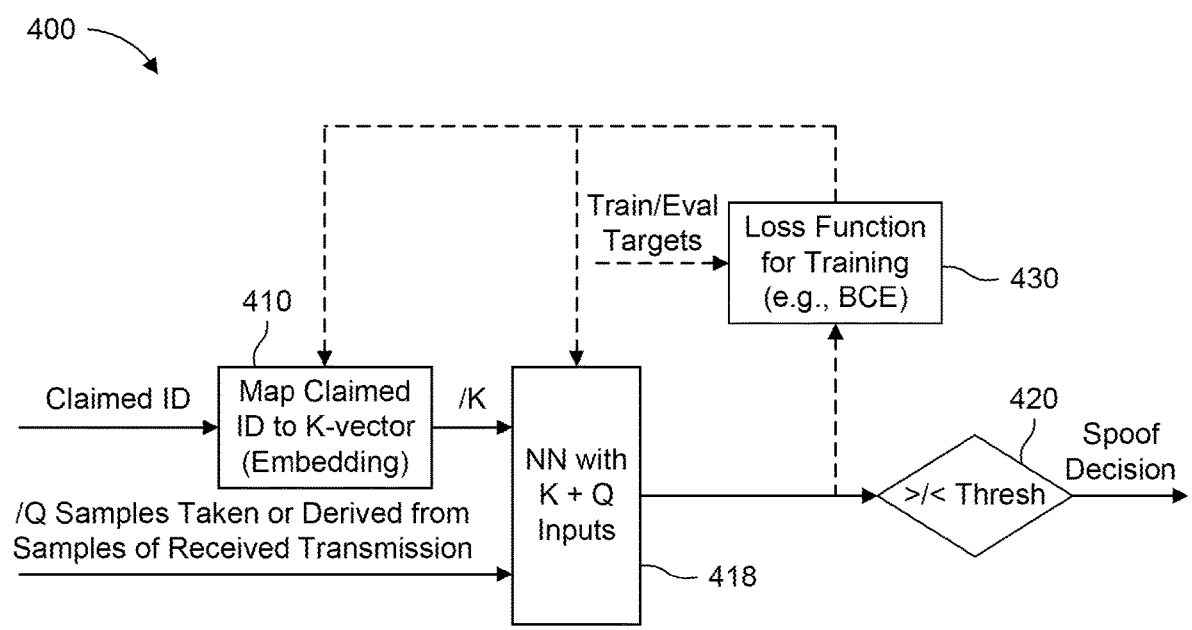
FIG. 4 illustrates an example spoofing detector.

FIG. 4 illustrates an example binary classifier 400. The binary classifier 400 may be implemented in any of an IoT device, a WTRU, a base station, etc. However, for convenience and simplicity of exposition, the binary classifier 400 is described herein as implemented in a WTRU. The binary classifier 400 is similar to the binary classifier 200 (FIG. 2), except that the binary classifier 400 includes a training loop (indicated at least in part by dashed lines in FIG. 4). For convenience and simplicity of exposition, the terms "binary classifier" and "spoofing detector" may be used interchangeably herein.

RF transmissions of one or more (e.g., each) radio that may be protected by the spoofing detector 400 may be collected and/or may be used to create a dataset for (e.g., initial) training of the NN (418), including creation of learned-ID vectors (embeddings). The RF transmissions may be collected during operation in a controlled environment and/or in-situ, such as, for example, when devices are first deployed and/or otherwise unlikely to be subject to spoofing.

The dataset may include samples from the received transmissions that may be labeled with a true identifier label. The label need not be used for training. Instead, each group (e.g., set) of samples from a particular transmission along with an identifier may be used to create multiple training examples with a binary label (e.g., True, if the true identifier is not used; False, if the true identifier is used) indicating spoofed or not spoofed. The not-spoofed label may correspond to the case where the identifier is the same as identifier label. The spoofed label may correspond to the case where the identifier is different from the identifier label.

As shown in FIG. 4, binary cross entropy (BCE) may be used during training, but others can be used as well. The input to the loss function may be a statistic output from the NN 418. The statistic may be a scalar and/or may be used, after training, in connection with (e.g., as one of multiple factors or the sole factor for) setting/adjusting the value for the threshold.

Filtering over multiple transmissions may be used, for example, to avoid triggering a warning based on a single isolated threshold crossing. The filtering may be performed on a per attributed identifier basis. For example, the spoofing detector 400 may have a filter associated with some or each identifier that the spoofing detector is protecting.

Figure 5:
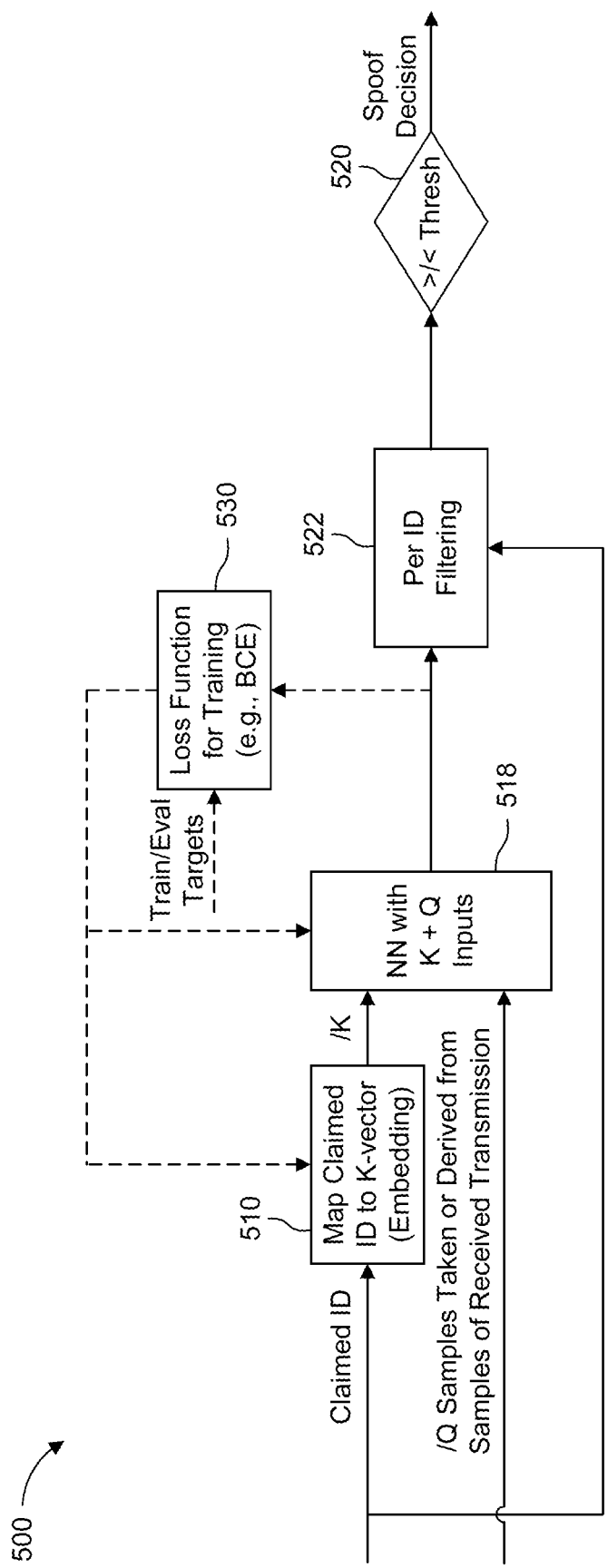
FIG. 5 illustrates an example spoofing detector.

FIG. 5 illustrates an example binary classifier 500. The binary classifier 500 may be implemented in any of an IoT device, a WTRU, a base station, etc. However, for convenience and simplicity of exposition, the binary classifier 500 is described herein as implemented in a WTRU. The binary classifier 500 is similar to the binary classifier 200 (FIG. 2) and the binary classifier 400 (FIG. 4), except that the binary classifier 500 includes a filter 522. The filter 522 may perform filtering on the statistic (predictive value) on a per attributed identifier basis. Filtering of the statistic prior to the comparator 520 (as shown in FIG. 5) may provide better performance than filtering the output of the comparator 520. Filtering the output of the comparator 520 may be implemented using lower complexity filter, and/or may use less memory, than filtering the statistic prior to the comparator 520. The filter may be a filter in the most general sense (it may be non-linear, time varying, or even another NN).

Figure 6:
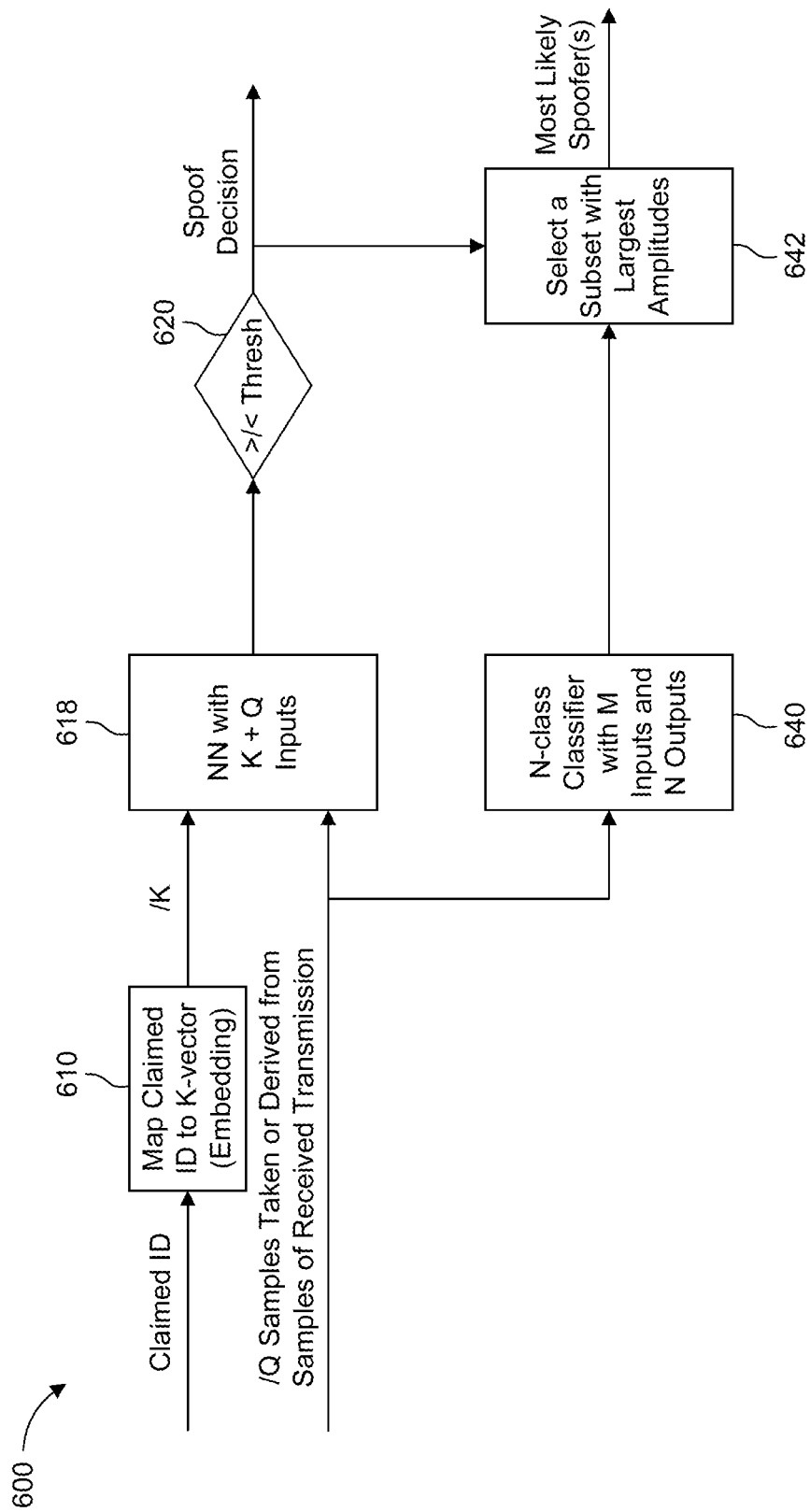
FIG. 6 illustrates an example spoofing detector combined with an N-class classifier

FIG. 6 illustrates an example spoofing detector 600 that may be used to gate an N-class classifier 640 to provide a list of candidate spoofing radio identifiers. As shown, the spoofing detector 600 is similar to the binary classifier 200 of (FIG. 2), except as disclosed herein. The N-class classifier 640 may have Minputs and N outputs. The Minputs may be fed with one or more samples of and/or derived from a received transmission. The N outputs and a spoofing decision output from the spoofing detector 600 may be fed to inputs of a selector 642. The selector 642 may select, based on the spoofing decision, a subset of the N outputs having the largest amplitudes. The selector 642 may output the subset of the N outputs as candidate spoofing radio identifiers (e.g., the most likely spoofing radio identifiers).

If a new radio is to be added to the system, e.g., a new radio to be protected, for which there is no identifier and/or learned vector (embedding), the entire anti-spoofing NN does not need to be retrained and/or distributed to other (e.g., all) nodes. Transmissions from the new radio may be used to train only the learned-ID vector (embedding) for the new radio (e.g., a new output vector may be created and learned with the NN and all other possible embedding outputs frozen). This may be done akin to a usual training method (e.g., where all weights may be updated by backpropagation, etc.) except that the rest of the NN is frozen, e.g., weights for the rest of the NN are not updated. In this way, any node with the anti-spoofing NN may train the new learned-ID vector (embedding), and distribute the new learned-ID vector (embedding) and/or send it to a database, repository, etc. If the new radio already has a learned ID vector in a data store, it can alternatively be sent and added to the systems without training.

The system may support a large number of radios and/or support scaling to a large number of radios. To facilitate this, the length of the learned-ID vector (embedding) and the width of the NN may be purposely oversized. For example, the length of the learned-ID vector and the width of the NN may be some amount (e.g., a factor of 10, 100, 1000, etc.) larger than would otherwise be expected (e.g., the number of subscribers of a particular operator, an average number of subscribers of a particular operator over a period of time, an average number of subscribers of a particular operator over a period of time on a per cell/base station basis, etc.).

Alternatively, a separate section of the NN may be created and not trained (e.g., not fully trained) during training with the initial set of radio data and identifiers. The separate section of the NN, for example, may be initialized with random weights that have similar distribution of a similar section of the network, or training of the section may be stopped after a small amount of training is completed. The separate section of the NN may operate as a reservoir of additional processing that new learned-ID vectors (embeddings) may be able to make use of, but may not have been 'trained on' otherwise. The separate section of the NN may only be 'switched on' for an added radio identifier, e.g., the outputs of the separate section may be set to zero and/or might not need to be computed when the newly added ID is not presented, but is switched on when the newly added ID is presented. The switching may be accomplished in any of various ways, e.g., one or more elements of learned-ID vectors (embeddings) that are forced to zero for existing radio identifiers may be allowed to train to nonzero values for newly added identifiers. The new learned-ID vectors (embeddings) for the new identifiers may be trained with this separate section of the NN turned on and so the embedding-like vector is trained along with a small portion of the NN.

In various embodiments, given a set of N radios (and N ID) have been used to train the embeddings to produce N K-length learned vectors, if a new radio and radio ID is required, an embedding element (e.g., embedding element 610) may be trained to produce an additional K-length learned vector for a total N+1 K-length learned vectors in such a way that the N K-length vectors are not changed. Only the additional $(N+1)^{th}$ K-length learned vector may be created and trained. In various embodiments, more than one additional K-length learned vector (e.g., N+P additional K-length learned vectors) may be created and trained. The part of the NN trained using the NK-length learned vectors is not further trained in this process. Additionally, a portion of the other part of the NN may have been untrained (in whole or in part) or the NN may have additional computation resources (e.g., neurons) added to it. The untrained portion and/or additional computation resources may be allowed to train while the embedding for the newly added radios and radio IDs are being trained.

Representative Distribution of Learned Vectors

For radios that are physically located outside a vicinity of a receiving device (e.g., those not likely to be within range of the receiving device over a given period of time), their corresponding learned-ID vectors (embeddings) might not be present in a local cache, repository, etc. and/or at the spoofing detector and/or in a local cache, repository, etc. associated therewith. The learned-ID vectors (embeddings) of radios that may be in the vicinity of the receiving device may be present in a local cache, repository, etc. and/or at the spoofing detector and/or in a local cache, repository, etc. associated therewith.

The identifiers thereof may be known by the network in advance and the corresponding learned-ID vectors (embeddings) may be distributed from a repository (database) to any of the spoofing detector; the local cache, repository, etc. associated therewith; and/or the receiving device/site (e.g., using any of a push or pull mechanism). Additionally, and/or alternatively, the spoofing detector; the local cache, repository, etc. associated therewith; and/or the receiving device/ site may obtain (e.g., via a pull or push mechanism) a learned-ID vector (embedding) corresponding to a particular attributed identifier from the same repository (database) or another repository (database) (e.g., if such learned-ID vector was not otherwise provided thereto).

If a device moves into a cell (with or without a handover (HO)), and begins transmission, the receiver, e.g., a base station, may check whether the attributed identifier of the device is represented in a look-up table (LUT) of learned-ID vectors ("learned-ID vector LUT"). If the learned-ID vector corresponding to the attributed identifier is not available locally (e.g., no entry for it in the learned-ID vector LUT), the receiver, e.g., a base station, may obtain it from another repository (database). The obtained learned-ID vector may be populated into the learned-ID vector LUT (e.g., by the base station).

Alternatively, when a device intends to move into a new cell and begins listening to a base station, the device, e.g., a WTRU, may check the attributed identifier of the base station to see if it is represented in a learned-ID vector LUT associated with the device. If learned-ID vector corresponding to the identifier is not available locally (e.g., no entry for it in the learned-ID vector LUT), the device may obtain it another repository (database), e.g., using the current base station or through other connectivity. The obtained learned-ID vector may be populated into the learned-ID vector LUT (e.g., by the base station and/or the device).

Performance

The performance of the embedding-like technique is characterized below. A direct comparison to the N-class classifier is not possible since their outputs are conceptually and dimensionally different, but in at least one case a meaningful comparison may be made.

Several simulations were carried out to evaluate the performance of the spoofing detector in accordance with embodiments disclosed herein. For the simulations, the output of the NN of the spoofing detector was configured to provide single real value. The single real value may be more positive when the radio identifier is thought to be more likely true by the NN (e.g., the value may be correlated with the likelihood of spoofing). The decision regarding spoofed vs non-spoofed was obtained by comparing the output to the threshold. However, two or more outputs could have been combined (e.g., averaged, weighted averaged, min/max, etc.) and then the combined outputs could have been compared to the threshold. The threshold was set to zero during training. The threshold was subsequently adjusted to tradeoff missed detection with false positives (and vice versa). Over-the-air transmissions from 48 Pycom FiPy LoRa IoT radios were collected with an Ettus E310 SDR radio.

Figure 7:
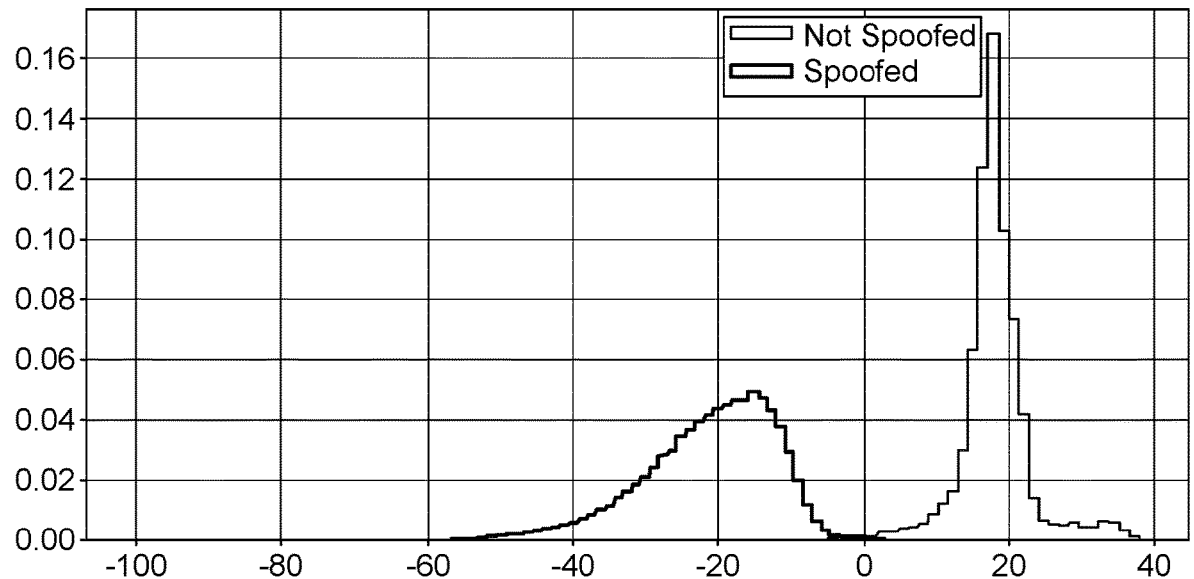
FIG. 7 illustrates probability densities of various neural network outputs.

FIG. 7 illustrates two conditional probability densities for predicted values output from NN (prior to threshold comparison) in connection with a first simulation. In the first simulation, each of the 48 radios in the training and test datasets were used to make both true and false claims about their identifiers. Notably, as shown in FIG. 7, the two distributions are very well separated with the one on the left is for spoofing radios (attributed identifier is false) and the one on the right is for non-spoofing radios (attributed identifier is true).

Figure 8:
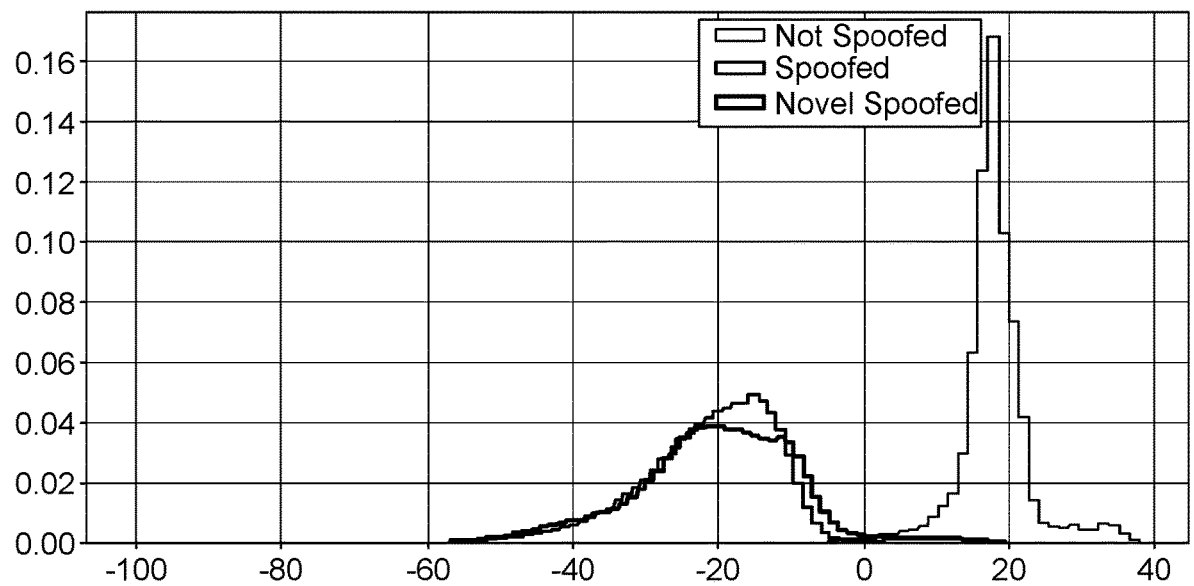
FIG. 8 illustrates probability densities of various neural network outputs.

FIG. 8 illustrates three conditional probability densities for NN outputs (prior to threshold comparison) from a second simulation to demonstrate that the spoofing detector can also detect when a novel radio (i.e., one that was not part of the training dataset) attempts to spoof the ID of another radio. In the second simulation, 8 of the 48 radios were randomly chosen to be the novel radios for testing and as such their transmissions were withheld from the training dataset. Each of the remaining 40 radios in the training and test data set were used to make both true and false claims about their identifiers. The case of 'novel radio, claimed ID is true' was not measured. Notably, spoofing by either the known radios or the novel radios produce a distribution that is well separated from the non-spoofed distribution. As shown, the two distributions on the left result from the novel radios and the spoofing by known radios, and the distribution on the right results from non-spoofing known radios.

Figure 9:
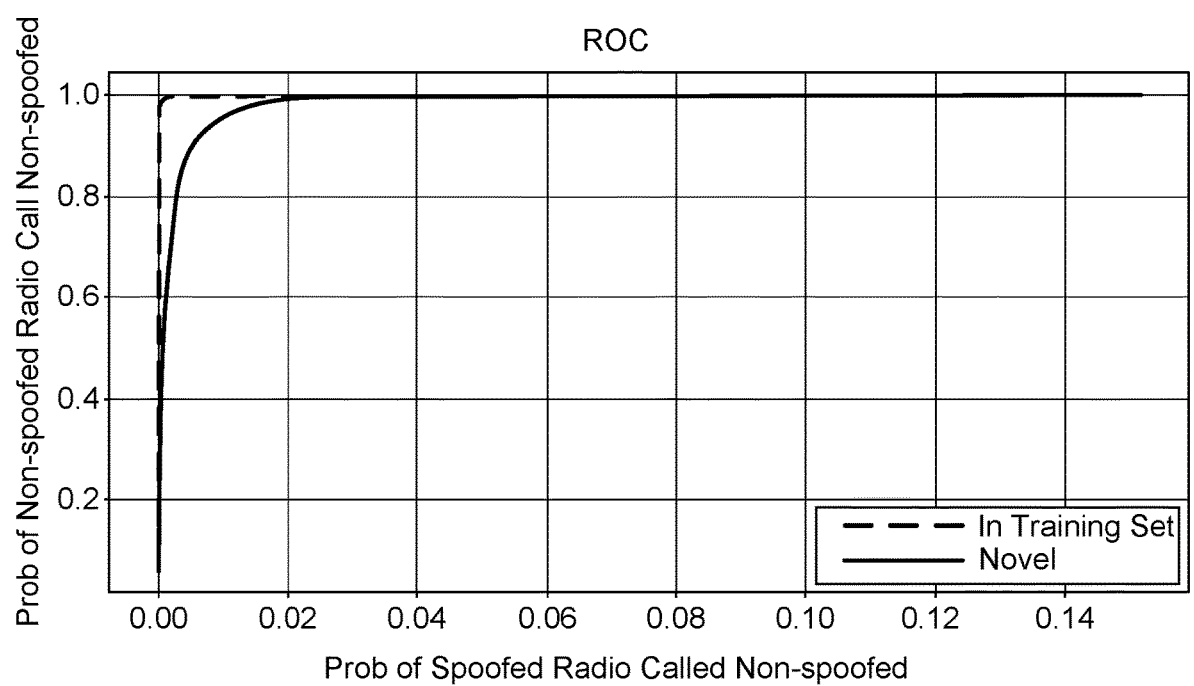
FIG. 9 illustrates receiver operating curves.

Unlike the N-class classifier, a performance tradeoff can be made by changing the decision threshold. A typical way to show performance in such system is with a receiver operating curve, which has its history in radar. By setting the threshold to different values, we tradeoff the probability of admitting a spoofing radio with the probability of not admitting a non-spoofing radio. Referring to FIG. 9, receiver operating curves (ROCs) illustrating the available trade off that can be made by varying the threshold value are shown. The locus of points over all threshold setting is shown in FIG. 9 for both the known and novel radio cases.

Comparing the accuracies of the N-Class classifier and the spoofing detector (with the threshold set to some value) is one possible direct comparison that can be made between the two approaches. For the comparison a threshold of zero was chosen, although it has not been determined to the be the best threshold for an accuracy measurement.

The N-Class classifier and spoofing detector were trained using the same 48 radio dataset and the accuracies thereof are listed in Table 1. The spoofing detector has substantially better accuracy.

TABLE 1

Accuracy of N-class Classifier and Spoofing Detector

| | N-Class Classifier | Spoofing Detector |
|---|---|---|
| Accuracy | 98.5% | 99.8% |

Figures 10, 11:
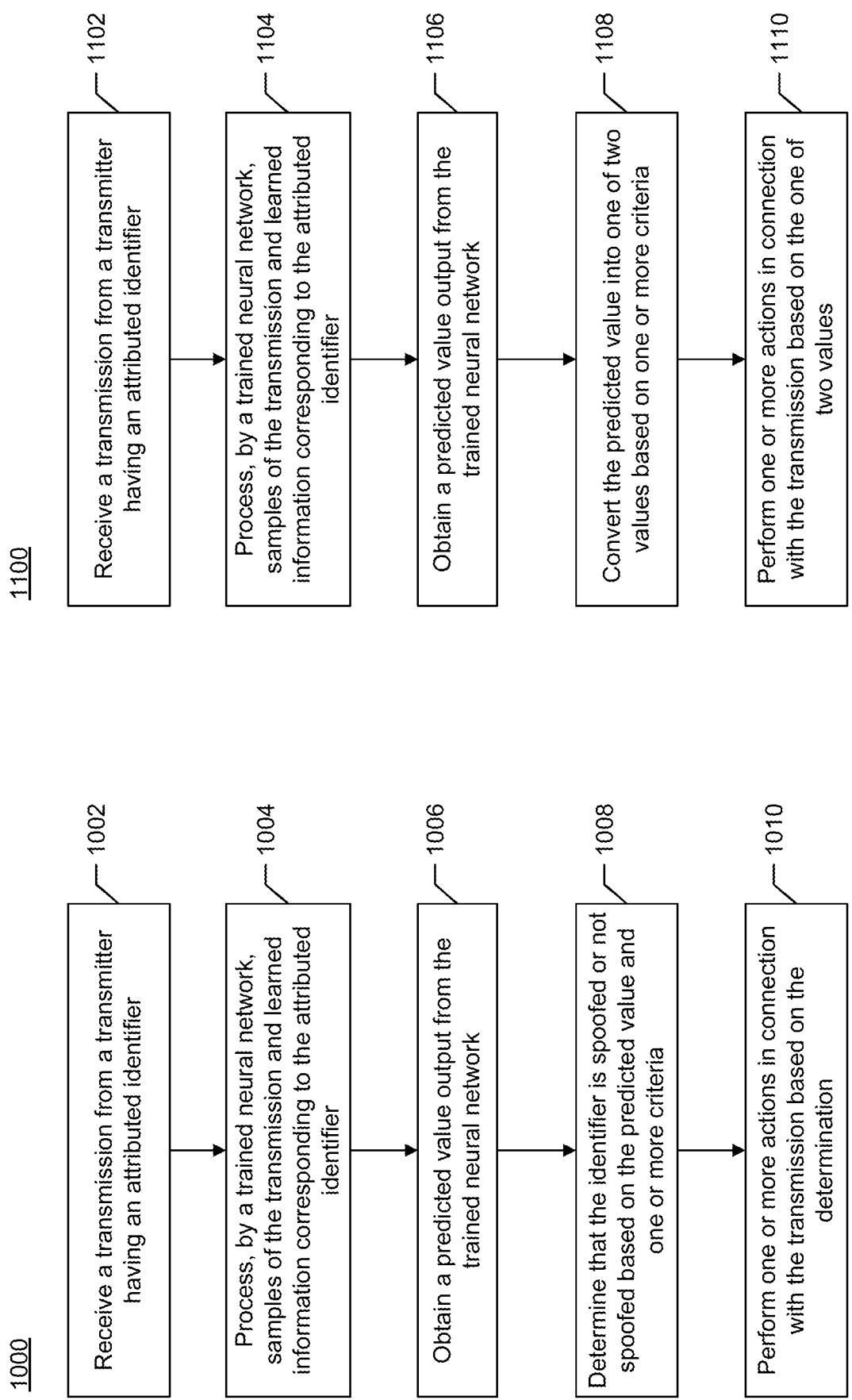
FIGS. 10-15 are flow charts illustrating example flows.

FIG. 10 is a flow chart illustrating an example flow 1000 in accordance with various embodiments. For convenience and simplicity of exposition, the flow 1000 and accompanying disclosures herein are described with reference to the architectures of the communications system 100 (FIG. 1) and the binary classifier 200 (FIG. 2). The flow 100 may be carried out using different architectures as well.

Referring now to FIG. 10, a receiver (e.g., a base station, a WTRU, etc.) may receive a transmission from a transmitter (e.g., a WTRU, a base station, etc.) having an attributed identifier (1002). The attributed identifier may be, for example, any of (i) an identifier attributed to the transmitter based on scheduler knowledge, and (ii) an identifier attributed to the transmitter based on inspection (and/or extraction) of information carried in, and/or indicated by, the transmission.

One or more samples of the transmission ("transmission samples") and learned information corresponding to the attributed identifier may be input into and/or processed by a trained NN (e.g., a trained NN of the receiver) (1004). The learned information may be and/or may have been derived (generated) based at least in part on categorical information associated with the attributed identifier.

In various embodiments, the learned information may be learned during training of the trained NN based on a plurality of observations. The plurality of observations may include one or more samples of RF signals combined with any of (i) the categorical information, (ii) one or more interim iterations (versions) of the learned information, (iii) other learned information derived from (e.g., learned and/or trained based at least in part on) categorical information associated with a different identifier, and (iv) one or more interim iterations (versions) of the other learned information. In various embodiments, the samples of the RF signals may include samples of RF signals collected from any of the transmitter and one or more other transmitters.

In various embodiments, the learned information may be learned without retraining of the trained NN. For example, the learned information may be learned based on one or more values predicted by the trained NN based one or more samples of RF signals combined with any of (i) the categorical information and (ii) other learned information derived from (e.g., learned and/or trained based at least in part on) categorical information associated with a different identifier. In various embodiments, the samples of the RF signals may include samples of RF signals collected from any of the transmitter and one or more other transmitters.

In various embodiments, the learned information may be a learned-ID vector. In various embodiments, the categorical information may map to the attributed identifier. In various embodiments, the categorical information may be an embedding.

The learned information may be learned in connection with (e.g., contemporaneously with) receipt of the transmission from a transmitter. Alternatively, or additionally, the learned information may be obtained from a local or a remote repository, e.g., based on (e.g., using) the attributed identifier and/or a proxy thereof.

The receiver may obtain a predicted value output from the trained neural network (1006) based on the transmission samples and the learned information. The receiver may determine that the identifier is spoofed or not spoofed based on the predicted value output from the trained NN and one or more criteria (1008). In various embodiments, the criteria may include any of a probability of missing a spoofing attempt, a probability of falsely classifying and a tradeoff therebetween. In various embodiments, the criteria may include a threshold and/or the threshold may be based on a probability of missing a spoofing attempt, a probability of falsely classifying and a tradeoff therebetween. In various embodiments, the receiver may adjust the threshold based on a probability of missing a spoofing attempt, a probability of falsely classifying and a tradeoff therebetween (not shown).

The receiver may perform one or more actions in connection with the transmission based on the determination (1010). For example, the receiver may issue an alert indicating that the transmission is suspicious based on (e.g., on condition that) a determination that the identifier is spoofed. Alternatively, the receiver may further process the transmission based on (e.g., on condition that) a determination is that the identifier is not spoofed.

Although not shown in FIG. 10, the receiver may train a neural network to form the trained NN. The receiver, for example, may train the neural network based at least in part on the categorical information. In various embodiments, the receiver may train the neural network based on (using) the plurality of observations disclosed supra. In various embodiments, the receiver may train the neural network in accordance with any of the disclosures herein supra and/or infra.

In various embodiments, the receiver may obtain any of the categorical information and the plurality of observations from a local repository and/or a remote repository (not shown). For example, the receiver may determine that the identifier does not match an identifier currently in use, and/or may obtain the categorical information and/or the plurality of observations from the local repository and/or the remote repository. In various embodiments, the receiver may transmit, to the local repository and/or the remote repository, information indicating a request for the categorical information and/or the plurality of observations, and/or may receive information indicating the categorical information and/or the plurality of observations.

FIG. 11 is a flow chart illustrating a flow 1100 in accordance with various embodiments. For convenience and simplicity of exposition, the flow 1100 and accompanying disclosures are described with reference to the architectures of the communications system 100 (FIG. 1) and the binary classifier 200 (FIG. 2). The flow 1100 may be carried out using different architectures as well. The flow 1100 is similar to the flow 1000 (FIG. 10), and for the sake of simplicity of exposition, incorporated herein are the flow 1000 and accompanying disclosures except for portions thereof corresponding to differences between the flows 1100 and 1000 disclosed below.

Referring now to FIG. 11, after obtaining a predicted value output from the trained neural network (1106), the receiver (e.g., a base station, a WTRU, etc.) may convert the predicted value into one of two values based on one or more criteria (1108), e.g., any of criteria disclosed herein supra and/or infra. The receiver may perform one or more actions in connection with the transmission based on the one of the two values (1110). For example, the receiver may issue an alert indicating that the transmission is suspicious based on (e.g., conditioned on) the one of two values corresponding to the identifier being spoofed. Alternatively, the receiver may further process the transmission based on (e.g., conditioned on) the one of two values corresponding to the identifier being not spoofed.

Figures 12, 13:
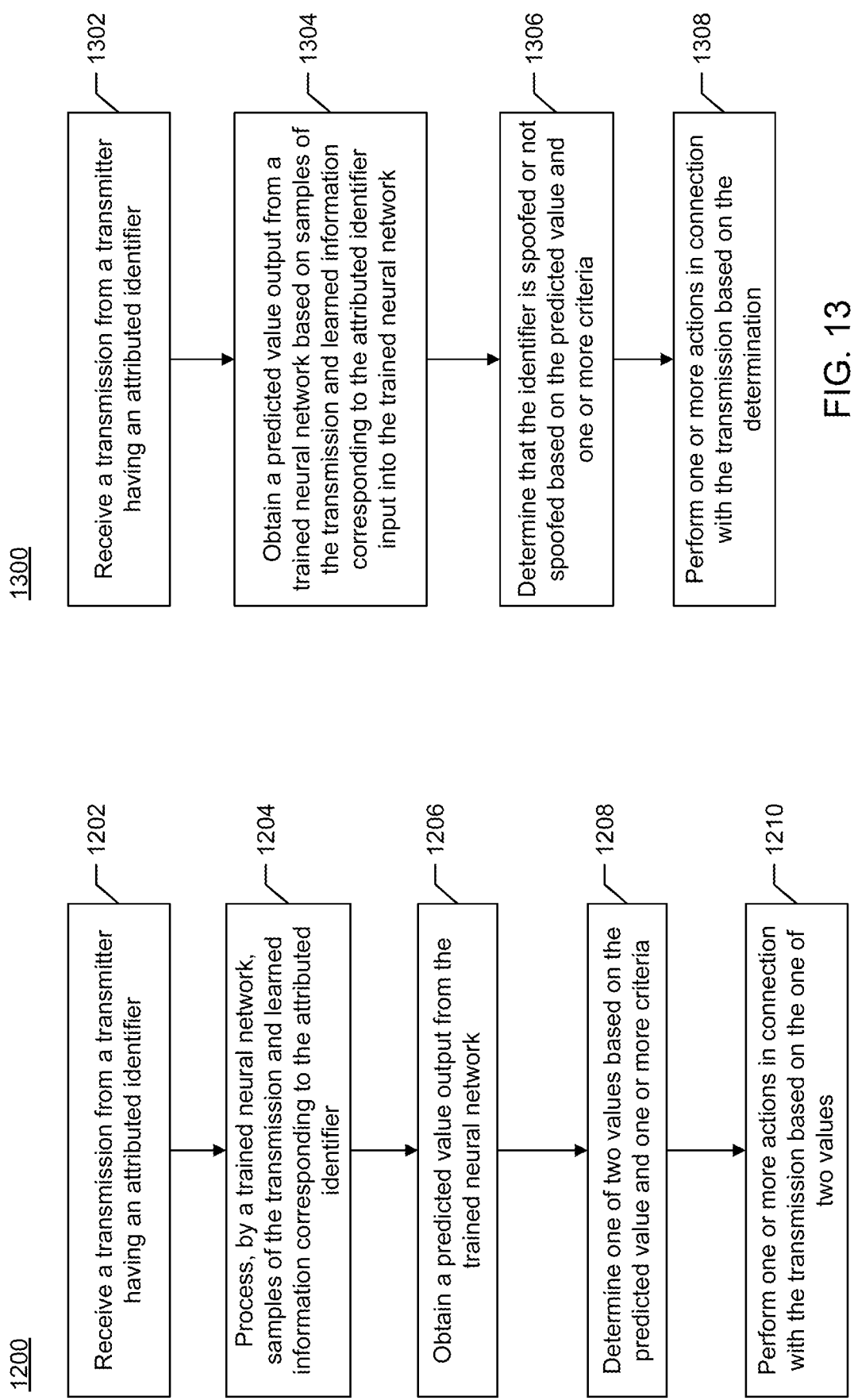

FIG. 12 is a flow chart illustrating a flow 1200 in accordance with various embodiments. For convenience and simplicity of exposition, the flow 1200 and accompanying disclosures are described with reference to the architectures of the communications system 100 (FIG. 1) and the binary classifier 200 (FIG. 2). The flow 1200 may be carried out using different architectures as well. The flow 1200 is similar to the flow 1100 (FIG. 11), except that, after obtaining a predicted value output from the trained neural network (1206), the receiver (e.g., a base station, a WTRU, etc.) may determine one of two values based on the predicted value and one or more criteria (1208), e.g., any of criteria disclosed herein supra and/or infra. For the sake of simplicity of exposition, incorporated herein are the flow 1100 and accompanying disclosures except for portions thereof corresponding to differences between the flows 1200 and 1100 disclosed supra.

FIG. 13 is a flowchart illustrating a flow 1300 in accordance with various embodiments. For convenience and simplicity of exposition, the flow 1300 and accompanying disclosures are described with reference to the architectures of the communications system 100 (FIG. 1) and the binary classifier 200 (FIG. 2). The flow 1300 may be carried out using different architectures as well. The flow 1300 is similar to the flow 1000 (FIG. 10), except that, following receipt of the transmission (1302), the receiver (e.g., a base station, a WTRU, etc.) may obtain a predicted value output from a trained neural network based on one or more samples of the transmission and learned information corresponding to the attributed identifier input into the trained neural network (1304). In various embodiments, the samples of the transmission and learned information may be fed into respective inputs of the trained NN. In various embodiments, the receiver (e.g., a base station, a WTRU, etc.) may obtain the predicted value by processing the samples of the transmission and learned information using the trained NN. After obtaining the predicted value, the receiver may determine that the identifier is spoofed or not spoofed based on the predicted value output from the trained NN and one or more criteria (1306) and/or may perform one or more actions in connection with the transmission based on the determination (1308), e.g., as disclosed supra. For the sake of simplicity of exposition, incorporated herein are the flow 1000 and accompanying disclosures except for portions thereof corresponding to differences between the flows 1300 and 1000 disclosed supra.

Figure 14:
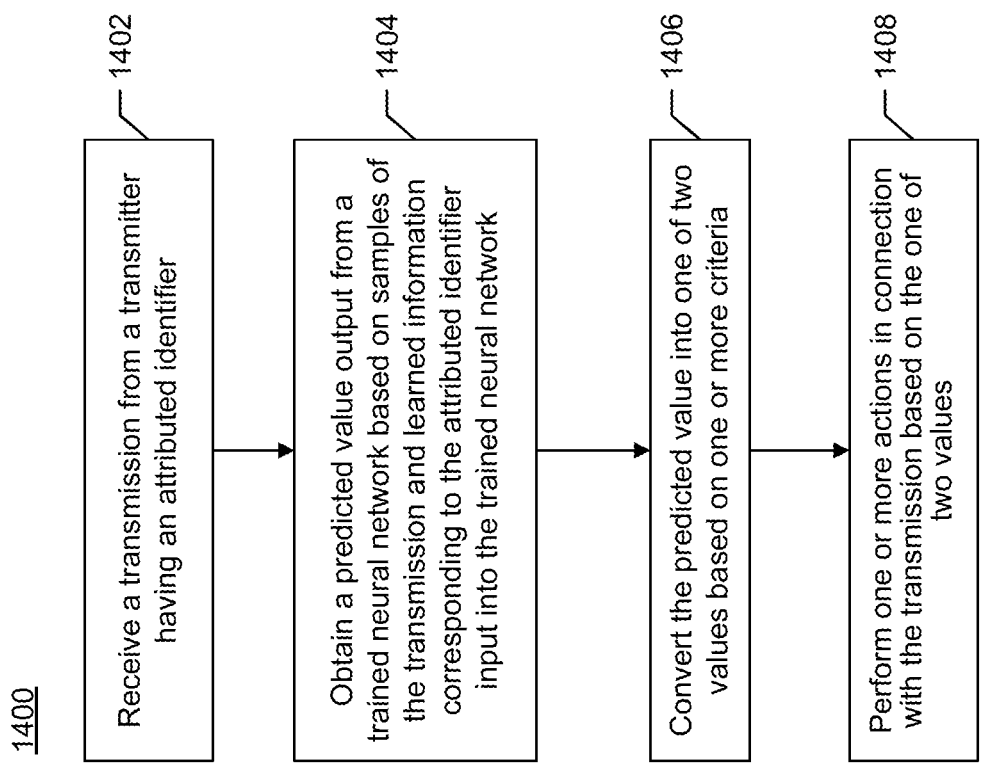

FIG. 14 is a flowchart illustrating a flow 1400 in accordance with various embodiments. For convenience and simplicity of exposition, the flow 1400 and accompanying disclosures are described with reference to the architectures of the communications system 100 (FIG. 1) and the binary classifier 200 (FIG. 2). The flow 1400 may be carried out using different architectures as well. The flow 1400 is similar to the flow 1100 (FIG. 11), except that, following receipt of the transmission (1402), the receiver (e.g., a base station, a WTRU, etc.) may obtain a predicted value output from a trained neural network based on one or more samples of the transmission and learned information corresponding to the attributed identifier input into the trained neural network (1404). In various embodiments, the samples of the transmission and learned information may be fed into respective inputs of the trained NN. In various embodiments, the receiver (e.g., a base station, a WTRU, etc.) may obtain the predicted value by processing the samples of the transmission and learned information using the trained NN. After obtaining the predicted value, the receiver may determine that the identifier is spoofed or not spoofed based on the predicted value output from the trained NN and one or more criteria (1406) and/or may perform one or more actions in connection with the transmission based on the determination (1408), e.g., as disclosed supra. For the sake of simplicity of exposition, incorporated herein are the flow 1400 and accompanying disclosures except for portions thereof corresponding to differences between the flows 1400 and 1100 disclosed supra.

Figure 15:
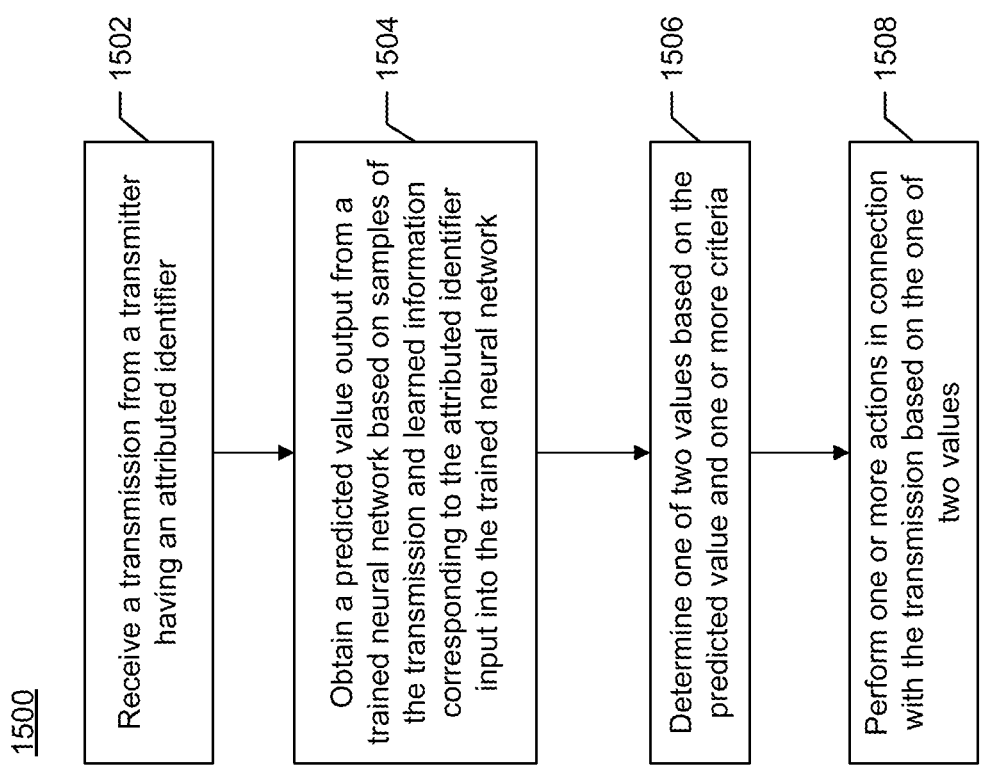

FIG. 15 is a flow chart illustrating a flow 1500 in accordance with various embodiments. For convenience and simplicity of exposition, the flow 1500 and accompanying disclosures are described with reference to the architectures of the communications system 100 (FIG. 1) and the binary classifier 200 (FIG. 2). The flow 1500 may be carried out using different architectures as well. The flow 1500 is similar to the flow 1200 (FIG. 12), except that, following receipt of the transmission (1502), the receiver (e.g., a base station, a WTRU, etc.) may obtain a predicted value output from a trained neural network based on one or more samples of the transmission and learned information corresponding to the attributed identifier input into the trained neural network (1504). In various embodiments, the samples of the transmission and learned information may be fed into respective inputs of the trained NN. In various embodiments, the receiver (e.g., a base station, a WTRU, etc.) may obtain the predicted value by processing the samples of the transmission and learned information using the trained NN. After obtaining the predicted value, the receiver may determine that the identifier is spoofed or not spoofed based on the predicted value output from the trained NN and one or more criteria (1506) and/or may perform one or more actions in connection with the transmission based on the determination (1508), e.g., as disclosed supra. For the sake of simplicity of exposition, incorporated herein are the flow 1500 and accompanying disclosures except for portions thereof corresponding to differences between the flows 1500 and 1200 disclosed supra.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plusfunction claim format, and any claim without the terms "means for" is not so intended.

What is claimed is:

1. A method comprising:
receiving a transmission comprising information indicating an identifier associated with a transmitter;
inputting one or more samples of the transmission into one or more first inputs of a trained neural network;
obtaining, from a repository of learned vectors, a learned vector corresponding to the identifier, wherein the learned vector is an embedding of categorical information associated with the identifier;
inputting the learned vector into one or more second inputs of the trained neural network;
obtaining a predicted value output from the trained neural network based on the one or more samples of the transmission and the learned vector;
determining whether the identifier is spoofed based on the predicted value and one or more criteria; and
performing one or more actions in connection with the transmission based on the determination.

2. The method of claim 1, wherein:
the determination is that the identifier is spoofed, and
performing the one or more actions comprises issuing an alert indicating that the transmission is suspicious.

3. The method of claim 1, wherein:
the determination is that the identifier is not spoofed, and
performing the one or more actions comprises further processing the transmission.

4. The method of claim 1, wherein the one or more criteria comprise any of a probability of missing a spoofing attempt, a probability of falsely classifying and a tradeoff therebetween.

5. The method of claim 1, wherein the one or more criteria comprise a threshold, and wherein the threshold is based on a probability of missing a spoofing attempt, a probability of falsely classifying and a tradeoff therebetween.

6. The method of claim 1, wherein the one or more criteria comprise a threshold, and the method comprising:
adjusting the threshold based on a probability of missing a spoofing attempt, a probability of falsely classifying and a tradeoff therebetween.

7. The method of claim 1, comprising: training a neural network to form the trained neural network, wherein the neural network is trained based at least in part on the categorical information.

8. The method of claim 1, comprising: training a neural network to form the trained neural network, wherein the neural network is trained based at least in part on a plurality of observations, and wherein the plurality of observations comprises one or more samples of radio frequency signals combined with any of (i) the categorical information, (ii) one or more interim iterations of the learned vector, (iii) other learned information derived from categorical information associated with a different identifier, and (iv) one or more interim iterations of the other learned information.

9. The method of claim 1, comprising:
determining that the identifier does not match an identifier currently in use; and
obtaining another learned vector from the repository.

10. The method of claim 1, wherein obtaining the learned vector from a repository comprises:
transmitting information indicating a request for the learned vector; and
receiving information indicating the learned vector.

11. The method of claim 1, wherein any of the one or more first inputs and the one or more second inputs are configured for input of continuous data.

12. An apparatus comprising circuitry, including a first transmitter, a receiver, a processor and memory, configured to:
receive a transmission comprising information indicating an identifier associated with a second transmitter;
input, into one or more first inputs of a trained neural network, one or more samples of the received transmission;
obtain, from a repository of learned vectors, a learned vector corresponding to the identifier, wherein the learned vector is an embedding of categorical information associated with the identifier;
input the learned vector into one or more second inputs of the trained neural network;
obtain a predicted value output from the trained neural network, wherein the predicted value is based on the one or more samples of the transmission and the learned vector;
determine whether the identifier is spoofed based on the predicted value and one or more criteria; and
perform one or more actions in connection with the transmission based on the determination.

13. The apparatus of claim 12, wherein:
the determination is that the identifier is spoofed, and
performing the one or more actions comprises issuing an alert indicating that the transmission is suspicious.

14. The apparatus of claim 12, wherein:
the determination is that the identifier is not spoofed, and
performing the one or more actions comprises further processing the transmission.

15. The apparatus of claim 12, wherein the one or more criteria comprise any of a probability of missing a spoofing attempt, a probability of falsely classifying and a tradeoff therebetween.

16. The apparatus of claim 12, wherein the one or more criteria comprise a threshold, and wherein the threshold is based on a probability of missing a spoofing attempt, a probability of falsely classifying and a tradeoff therebetween.

17. The apparatus of claim 12, wherein the one or more criteria comprise a threshold, and wherein the circuitry is configured to:
adjust the threshold based on a probability of missing a spoofing attempt, a probability of falsely classifying and a tradeoff therebetween.

18. The apparatus of claim 12, wherein the circuitry is configured to: train a neural network to form the trained neural network, wherein the neural network is trained based at least in part on the categorical information.

19. The apparatus of claim 18, wherein the circuitry is configured to: train a neural network to form the trained neural network, wherein the neural network is trained based at least in part on a plurality of observations, and wherein the plurality of observations comprises one or more samples of radio frequency signals combined with any of (i) the categorical information, (ii) one or more interim iterations of the learned vector, (iii) other learned information derived from categorical information associated with a different identifier, and (iv) one or more interim iterations of the other learned information.

20. The apparatus of claim 12, wherein the circuitry is configured to:
- determine that the identifier does not match an identifier currently in use; and
- obtain another learned vector from the repository.

21. The apparatus of 12, wherein the memory comprises the repository.

22. The apparatus of claim 12, wherein the circuitry being configured to obtain the learned vector from a repository comprises the circuitry being configured to:
- transmit information indicating a request for the learned vector; and
- receive information indicating the learned vector.

23. The apparatus of claim 12, wherein the apparatus is, is configured as or configured with elements of, a wireless transmit/receive unit.

24. The apparatus of claim 12, wherein the apparatus is, is configured as or configured with elements of, a network element or a base station.

\* \* \* \* \*